US008341689B2

(12) United States Patent  (10) Patent No.: US 8,341,689 B2
Craddock et al.  (45) Date of Patent: Dec. 25, 2012

(54) AUTOMATIC FREQUENCY COMPENSATION OF VIDEO SIGNALS TRANSMITTED ACROSS CABLES

(75) Inventors: Warren Craddock, Alameda, CA (US); Elias Andrikopoulos, Santa Clara, CA (US)

(73) Assignee: Intersil Americas Inc., Milpitas, CA (US)

( * ) Notice: Subject to any disclaimer, the term of this patent is extended or adjusted under 35 U.S.C. 154(b) by 1549 days.

(21) Appl. No.: 11/255,360

(22) Filed: Oct. 21, 2005

(65) Prior Publication Data

US 2007/0052849 A1 Mar. 8, 2007

Related U.S. Application Data

(60) Provisional application No. 60/715,373, filed on Sep. 7, 2005.

(51) Int. Cl.
*H04N 7/16* (2011.01)
(52) U.S. Cl. ............ 725/149; 725/148; 725/151; 333/16
(58) Field of Classification Search .................. None
See application file for complete search history.

(56) References Cited

U.S. PATENT DOCUMENTS

| | | | | |
|---|---|---|---|---|
| 4,151,490 | A * | 4/1979 | Bazin ............................... | 333/16 |
| 7,221,389 | B2 | 5/2007 | Ahern et al. | |
| 2005/0134748 | A1* | 6/2005 | Hoerl ............................ | 348/734 |
| 2006/0245517 | A1* | 11/2006 | Ikedo et al. .................... | 375/297 |
| 2007/0296868 | A1 | 12/2007 | Hall | |

FOREIGN PATENT DOCUMENTS

| | | |
|---|---|---|
| EP | 0611059 | 8/1994 |
| GB | 466 092 | 5/1937 |
| JP | 05 284064 | 10/1993 |
| JP | 05 284065 | 10/1993 |
| WO | WO 03/071804 | 8/2003 |

OTHER PUBLICATIONS

James Stewart, Calculus: Third Edition, Copyright 1995 by Brooks/Cole Publishing Company, ISBN 0 534-21798-2, pp. 100-109.*
Intersil; CAT-5 Video Transmission: Troubleshooting and Equalization; Application Note; Aug. 2, 2007; 8 pages; AN1307.0.
Intersil; Differential Receiver/Equalizer; Data Sheet; Nov. 30, 2007; 10 pages; FN7305.5.
Intersil; Transmitting SXGA Video Signal Through 1kft (300m) CAT-5 Cable; Application Note; Jan. 2, 2008; AN1318.0.
Pearson, J., "Adjustable Cable Equalizer Combines Wideband Differential Receiver with Analog Switches," Analog Dialogue 38-07, pp. 1-4 (Jul. 2004).
Intersil; Sync Separator with Horizontal Output; Data Sheet; Jul. 26, 2004; 9 pages; FN7010.1.

(Continued)

*Primary Examiner* — Joshua Taylor
(74) *Attorney, Agent, or Firm* — Vierra Magen Marcus & DeNiro LLP (57) ABSTRACT

Systems and methods to provide automatic compensation for frequency attenuation of a video signal transmitted over a cable are provided. Frequency compensation is applied to a received video signal that was transmitted over the cable to thereby produce a compensated video signal. A shape of a horizontal sync portion of the compensated video signal is analyzed. The frequency compensation is automatically adjusted based on the shape of the horizontal sync portion of the compensated video signal. This abstract is not intended to be a complete description of the various embodiments of the present invention.

14 Claims, 7 Drawing Sheets

OTHER PUBLICATIONS

Intersil; 100MHz Differential Twisted-Pair Drivers; Data Sheet; Oct. 29, 2004; 13 pages; FN7309.5.

Intersil; Differential Receiver/Equalizer; Data Sheet; Jul. 15, 2005; 8 pages; FN7305.4.

Intersil; 170MHz Triple Video Digitizer with Digital PLL; Data Sheet; Jun. 6, 2005; 29 pages; FN8218.0.

Partial European Search Report for European Patent Application No. EP 09174643.

European Search Report for European Patent No. EP 2182647, dated Apr. 23, 2010.

* cited by examiner

FIG. 1A
SYNC OF
PROPERLY COMPENSATED
VIDEO

FIG. 1B
SYNC OF
UNDERCOMPENSATED
VIDEO

FIG. 1C
SYNC OF
OVERCOMPENSATED
VIDEO

AUTOMATIC FREQUENCY COMPENSATION OF VIDEO SIGNALS TRANSMITTED ACROSS CABLES

PRIORITY CLAIM

This application claims priority under 35 U.S.C. 119(e) to U.S. Provisional Patent Application No. 60/715,373, filed Sep. 7, 2005, which is incorporated herein by reference.

FIELD OF THE INVENTION

Embodiments of the present invention relate to the field of video transmission, and more specifically, to automatically compensating for frequency attenuation that occurs to video signals transmitted across cables (e.g., CAT5 cables).

BACKGROUND

Category 5 (CAT5) is an Ethernet cable standard defined by the Electronic Industries Association and Telecommunications Industry Association (EIA/TIA). CAT5 cable, which includes four unshielded twisted-pairs of wire, was originally intended to support Fast (100 Mbps) Ethernet and comparable alternatives such as ATM. As with all other types of twisted pair EIA/TIA cabling, CAT5 cable runs are intended to be limited to a maximum recommended run rate of 100 m (328 feet).

The ubiquity and cost-effectiveness of CAT5 cabling make it an attractive choice for video distribution. Hotels and office buildings are perfect environments for video distribution, and are often already wired with CAT5 unshielded twisted-pair (UTP) cable. CAT5 is also cheaper and easier to install than coaxial cable. However, CAT5 cable was originally not intended for high bandwidth video signal applications, since it has substantial attenuation as frequencies increase. In video applications, high frequencies are used to represent both sharp image details and color information. Thus, this attenuation can seriously impact picture quality. Accordingly, there is a need to overcome the high frequency attenuation that occurs when using CAT5 cable, or similar cable, for video signal transmission.

Since unshielded twisted-pair (UTP) cables are now being used for video transmission, companies have begun to design receivers and equalizers that specifically compensate for the high frequency attenuation caused by such cables. One example of this is the EL9110 Differential Receiver/Equalizer available from Intersil Corporation, of Milpitas, Calif. This device accepts a control voltage signal that can be used to set the compensation levels required for different lengths of cable. Thus, if a specific receiver/equalizer is always receiving a video transmission over the same cable of unchanging length, the compensation level at the receiver/equalizer can be manually set once, and video signals should be correctly compensated thereafter. However, a challenge exists where a receiver/equalizer can receive video transmission from various different transmitters, over cables of various different lengths, such as may occur in a building that is wired for video conferencing. In such a case, each time a receiver receives a video transmission over a cable of a different length, the compensation level needs to be adjusted. It would be beneficial if such adjustment could be automatic.

SUMMARY

Embodiments of the present invention relate to systems and methods for providing automatic compensation for frequency attenuation of a video signal transmitted over a cable, such as, but not limited to, a CAT5 cable. In accordance with an embodiment, an equalizer receives a video signal that was transmitted over a cable, provides compensation for frequency attenuation that occurred during the transmission over the cable, and outputs a compensated video signal which is provided to a compensation controller. The compensation controller automatically adjusts the compensation provided by the equalizer based on a shape of a horizontal sync portion of the compensated video signal.

In accordance with a specific embodiment, the compensation controller includes a sync separator, a horizontal sync waveshape analyzer and an adjuster. The sync separator receives the compensated video signal and outputs a horizontal sync signal indicative of the presence of the horizontal sync portion of the compensated video signal. The horizontal sync waveshape analyzer receives the horizontal sync signal and the compensated video signal and analyzes the shape of the horizontal sync portion of the compensated video signal. The adjuster adjusts the compensation provided by the equalizer based on the analyzed shape of the horizontal sync portion of the compensated video signal.

In accordance with a specific embodiment, the horizontal sync waveshape analyzer analyzes the shape of the horizontal sync portion of the compensated video signal by determining a slope of a sync tip of the horizontal sync portion. The analyzer can do this, e.g., by sampling the sync tip at two or more points, and determining the slope from the samples. The adjuster adjusts the compensation provided by the equalizer based on the determined slope of the sync tip. In a specific embodiment, the adjuster adjusts the compensation of the equalizer so that the slope of the sync tip is less than a minimum acceptable slope.

In accordance with a specific embodiment, the compensation controller includes a sync separator, a timing circuit, first and second hold circuits and a differential integrator. The sync separator receives the compensated video signal and outputs a horizontal sync signal indicative of the presence of the horizontal sync portion of the compensated video signal. The timing circuit receives the horizontal sync signal and outputs a first trigger signal and a second trigger signal. The first hold circuit samples or tracks the compensated video signal in response to the first trigger signal and outputs a first voltage signal. The second hold circuit samples or tracks the compensated video signal in response to the second trigger signal and outputs a second voltage signal. The differential integrator receives the first and second voltage signals and outputs a compensation adjustment signal that adjusts the compensation provided by the equalizer. When the compensation adjustment signal output by the differential integrator reaches a steady state, the equalizer provides optimal compensation This summary is not intended to be a complete description of the various embodiments of the present invention. Further and alternative embodiments, and the features, aspects, and advantages of the present invention will become more apparent from the detailed description set forth below, the drawings and the claims.

DETAILED DESCRIPTION

Amongst other features, a video signal, such as an NTSC (National Television System Committee) or composite video signal, includes various synchronization (sync) pulses used for receiver scan timing. The most negative-going or low-going features of a video waveform are the various sync details, and they occur in every sequential scan of horizontal video lines traced on a video monitor. Video display frames are transmitted from the upper left hand corner of the screen with video scanning left to right, until it comes to the end of the line, then a horizontal sync occurs, causing the display monitor to prepare for scanning the next line, again from left to right. This occurs for a few hundred lines until the display has finished the bottom line, after which modifications of the horizontal sync called vertical sync waveforms are issued. The vertical sync details also achieve the same negative levels as the horizontal sync, and prepare the display to begin scanning the top horizontal line of the next full-screen display. However, the vertical syncs are longer and much more complex than horizontal syncs.

Each line of a video signal begins with the low-going horizontal sync pulse, which has edges that are generally square. The bottom of the horizontal sync, which is usually called the sync tip, generally has a flat slope (i.e., a zero slope). This shape of the sync portion of a video signal, including the shape of the sync tip, will be affected if attenuation of the video signal is not properly compensated for, as can be appreciated from FIGS. 1A, 1B and 1C discussed below.

Figure 1A:
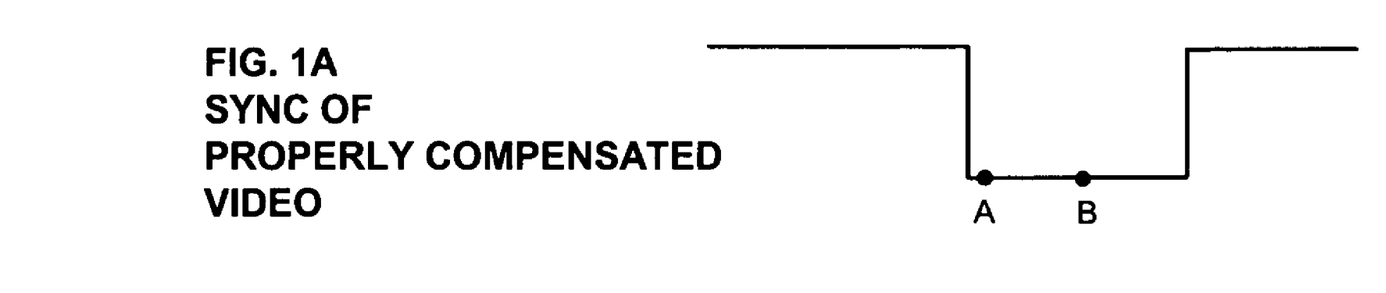
FIG. 1A shows a horizontal sync portion of a received video signal that is properly compensated.
Figure 1B:
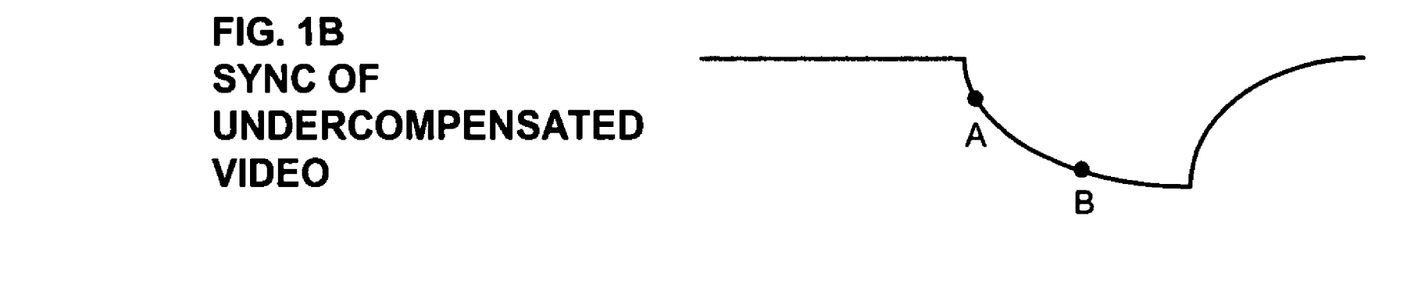
FIG. 1B shows a horizontal sync portion of a received video signal this is grossly undercompensated.
Figure 1C:
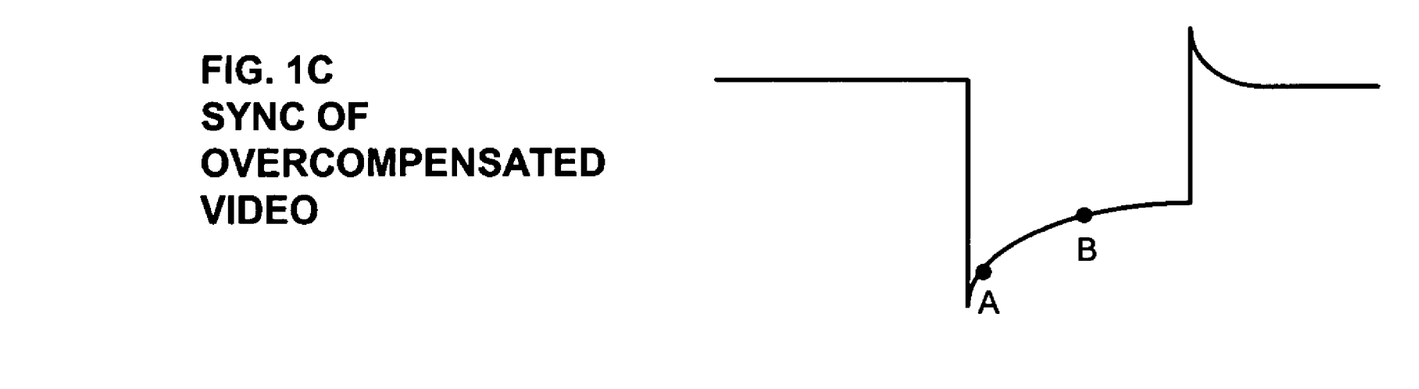
FIG. 1C shows a horizontal sync portion of a received video signal that is grossly overcompensated.

FIG. 1A shows a horizontal sync portion of a received video signal that is properly compensated, where the edges of the sync are square, and the slope of the sync tip is flat. In contrast, FIG. 1B shows a horizontal sync portion of a received video signal this is grossly undercompensated, causing the edges of the sync to be soft and indistinct, and the slope of the sync tip to be significant, due to the cable's attenuation of the high-frequency components. FIG. 1C shows a horizontal sync portion of a received video signal that is grossly overcompensated, causing the edges of the sync to be sharp but overshoot the ideal shape, and the slope of the sync tip to be significant, due to the overcompensation of the high-frequency components. When the horizontal sync is undercompensated or overcompensated, the rest of the video signal suffers equally. However, the sync portion of the video signal shows the effect of undercompensation and overcompensation most dramatically, since the square edges of the sync are the highest frequency components of the video signal. Additionally, effects of undercompensation and overcompensation are most noticeable in the sync, since the correct shape of the sync is known.

Consider the points labeled "A" and "B" in FIGS. 1A, 1B and 1C. In a properly-compensated video signal, the sync tip is flat, and the slope between points A and B is roughly zero, as shown in FIG. 1A. In an undercompensated video signal, the sync tip is not flat, and there is a large negative slope between points A and B, as shown in FIG. 1B. In an overcompensated video signal, the sync tip is not flat, and there is a large positive slope between points A and B, as shown in FIG. 1C.

As will be described below, in accordance with embodiments of the present invention, the shape of the horizontal sync portion of the video signal (often referred to herein simply as "the sync") is used to measure the compensation quality, and provide a mechanism to develop an auto-equalization loop. In certain embodiments, the shape of the sync is analyzed by determining the slope of the sync tip. In other embodiments, the shape of the sync tip is analyzed by essentially determining the area under the sync curve.

Figure 2:
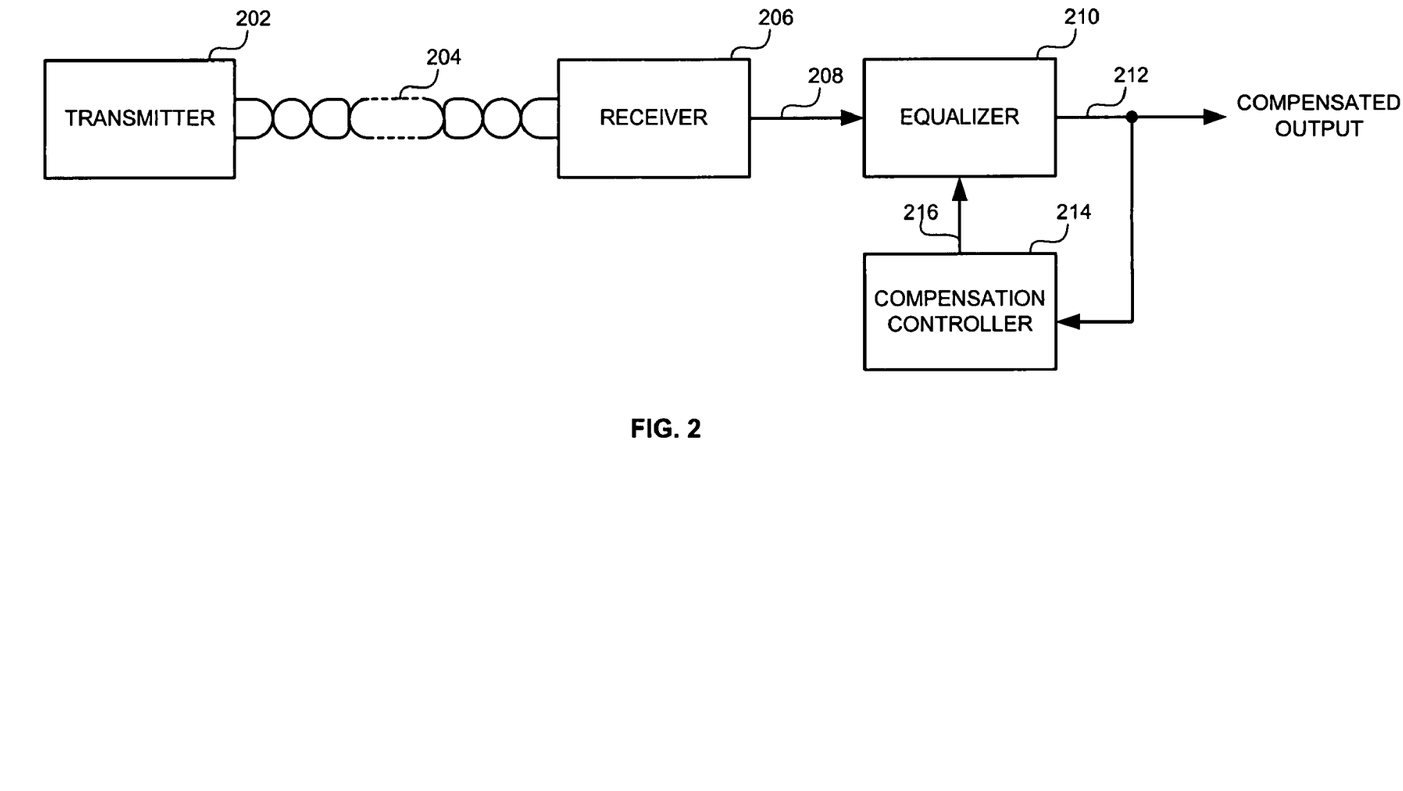
FIG. 2 is a high level block diagram that is useful for describing embodiments of the present invention that are used to compensate for attenuation that occurs when a video signal is transmitted over a cable, such as a CAT5 cable.

FIG. 2 is a high level diagram that is useful for explaining various embodiments of the present invention. Referring to FIG. 2, a transmitter 202 is shown as communicating with a receiver 206 over a cable link 204, which can be, e.g., an unshielded twisted pair such a CAT5 cable. The signal that is transmitted over the cable link 204 can be, e.g., a NTSC video signal, or some other type of video signal. The video signal output 208 of the receiver 206 is shown as being provided to an equalizer 210 that compensates for the high frequency attenuation caused by the cable link 204 and outputs a compensated video signal 212. Preferably the frequency compensation provided by the equalizer 210 is appropriate to the type of cable that caused the frequency attenuation.

The equalizer 210, which can be part of or combined with the receiver 206 as discussed below, has a control input that receives a control signal 216, which is used to adjust the compensation level of the equalizer. Embodiments of the present invention automatically adjust the compensation control signal 216, so that the compensated video signal 212 output by the equalizer 210 is correctly compensated. More specifically, in accordance with specific embodiments of the present invention, the compensation controller 214 automatically adjusts the control signal 216 based on the shape of the horizontal sync portion of the compensated video signal 212.

Figure 3:
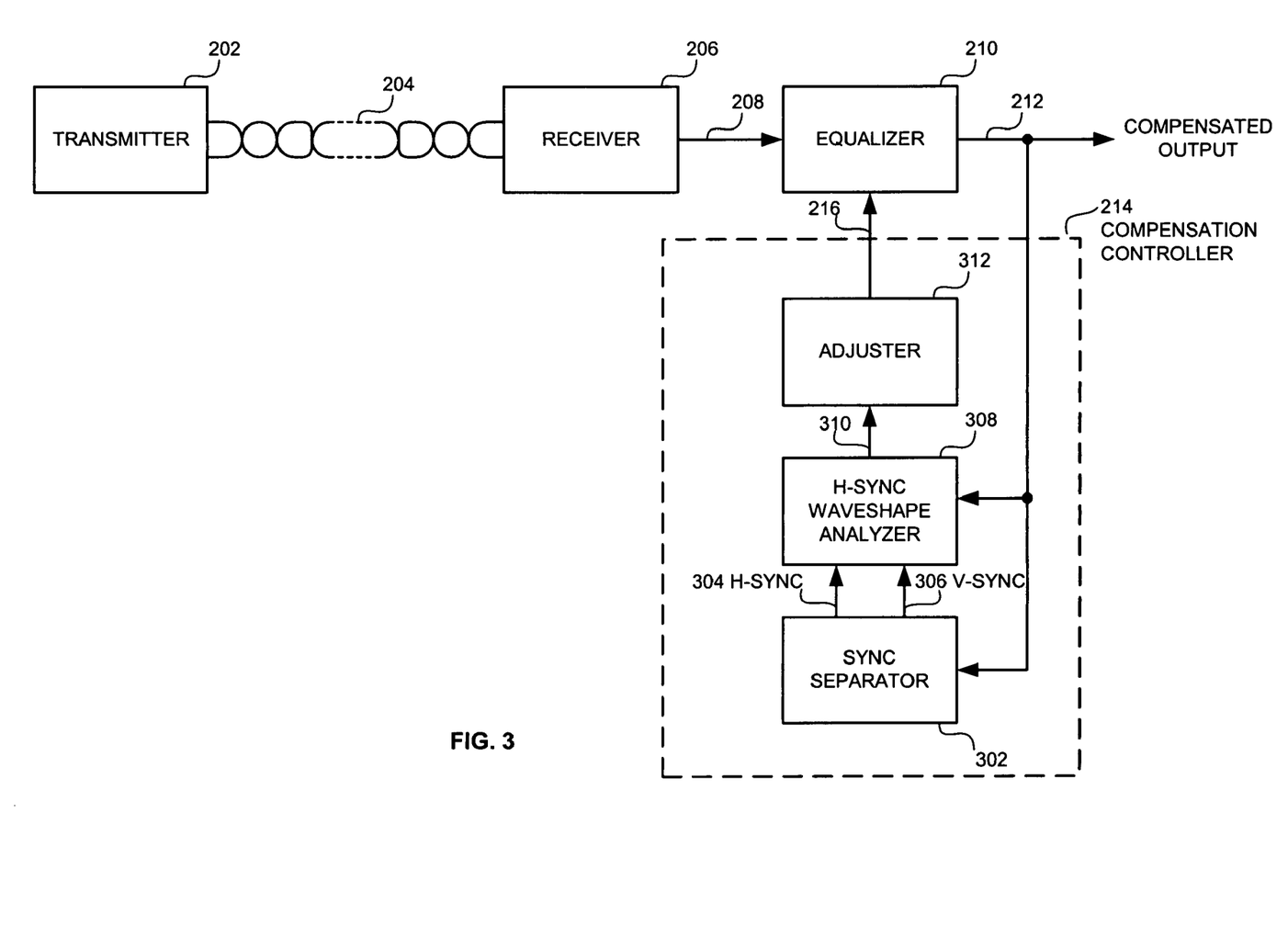
FIG. 3 is a block diagram that shows additional details of the compensation controller of FIG. 2, according to specific embodiments of the present invention.

FIG. 3 provides some additional details of the compensation controller 214. As shown in FIG. 3, in accordance with specific embodiments of the present invention, the compensation controller 214 includes a sync separator 302, an H-sync waveshape analyzer 308 and an adjuster 312. The compensated video signal 212 output by the equalizer 210 is provided to both the sync separator 302 and the H-sync waveshape analyzer. The sync separator 302 outputs at least a horizontal sync (H-sync) signal 304, and preferably also a vertical sync (V-sync) signal 306, which are provided to the H-sync waveshape analyzer. The H-sync signal 304 is indicative of the presence of the H-sync portion of the compensated video signal 212. Similarly, the vertical sync (V-sync) signal is indicative of the presence of the V-sync portion of the compensated video signal 212. Using the H-sync signal 304 (and optionally also V-sync signal 306), the H-sync waveshape analyzer 308 knows the location of the H-sync portion of the compensated video signal 212 so that it can analyze the shape of the H-sync portion. In specific embodiments, the analyzer 308 provides an output 310, indicative of the shape of the H-sync portion, to the adjuster 312. The adjusts 312, based on the analyzed shape of the H-sync portion, adjusts the compensation provided by the equalizer 210. In specific embodiments, the adjuster 312 accomplishes this by appropriately adjusting the compensation control signal 216 provided to the equalizer 210.

As explained above in the discussion of FIGS. 1A, 1B and 1C, in a properly compensated video signal, the slope of the sync tip should be substantially flat (i.e., have a substantially zero slope). In accordance with specific embodiments of the present invention, the H-sync waveshape analyzer 308 analyzes the shape of the H-sync portion of the compensated video signal 212 by determining the slope of the sync tip of the horizontal sync portion of the compensated video signal 212, as described below.

The H-sync waveshape analyzer 308 receives the H-sync signal 304 from the sync separator 302. The H-sync signal has a falling edge that is indicative of the start of the horizontal sync tip and a rising edge that is indicative of the end of the horizontal sync tip (or vise versa). Based on such rising and falling edges, the waveshape analyzer 308 samples the sync tip of the H-sync portion of the compensated video signal 212 at two (or more) points. For example, the waveshape analyzer 308 (which in this embodiment acts as a slope detector) can obtain a first sample of the sync tip shortly after it begins (e.g., shortly after the corresponding rising or falling edge of the horizontal sync signal), and then a second sample at another point thereafter, yet prior to the end of sync tip. Points A and B in FIGS. 1A, 1B and 1C illustrate two such sample points. Based on the two (or more) samples of the sync tip, the H-sync waveshape analyzer 308 determines the slope of the sync tip, e.g., by plugging the sample values into a simple algorithm or look-up-table. The H-sync waveform analyzer 308 provides the signal 310 to the adjuster 312, with the signal 310 being indicative of the slope of the sync tip. The adjuster 312, based on the slope of the sync tip, adjusts the compensation provided by the equalizer 210 to try to make the determined slope generally flat. In an embodiment, the adjuster 312 adjusts the compensation provided by the equalizer 210 until the slope of the sync tip is less than a specified minimum acceptable slope (e.g., a 10% slope). For example, if the slope is too negative, then the adjuster 312 knows the video signal is undercompensated, and thus that the compensation provided by the equalizer 210 should be increased. Similarly, if the slope is too positive, then the adjuster 312 knows the video signal is overcompensated, and thus, that the compensation provided to the equalizer 210 should be decreased.

In summary, an auto-equalization feedback loop including the equalizer 210, the sync separator 302, the H-sync waveshape analyzer 308 and the adjuster 312 is used to automatically adjust the compensation provided by the equalizer 210, so that the equalizer 210 appropriately compensates for the high frequency attenuation caused by the cable 204.

As mentioned above, the H-sync waveshape analyzer 308 may also receive the V-sync signal 306 from the sync separator 302. This is useful to prevent the H-sync waveshape analyzer 306 from trying to analyze the shape of the H-sync portion of the compensated video signal during the V-sync period.

Figure 4:
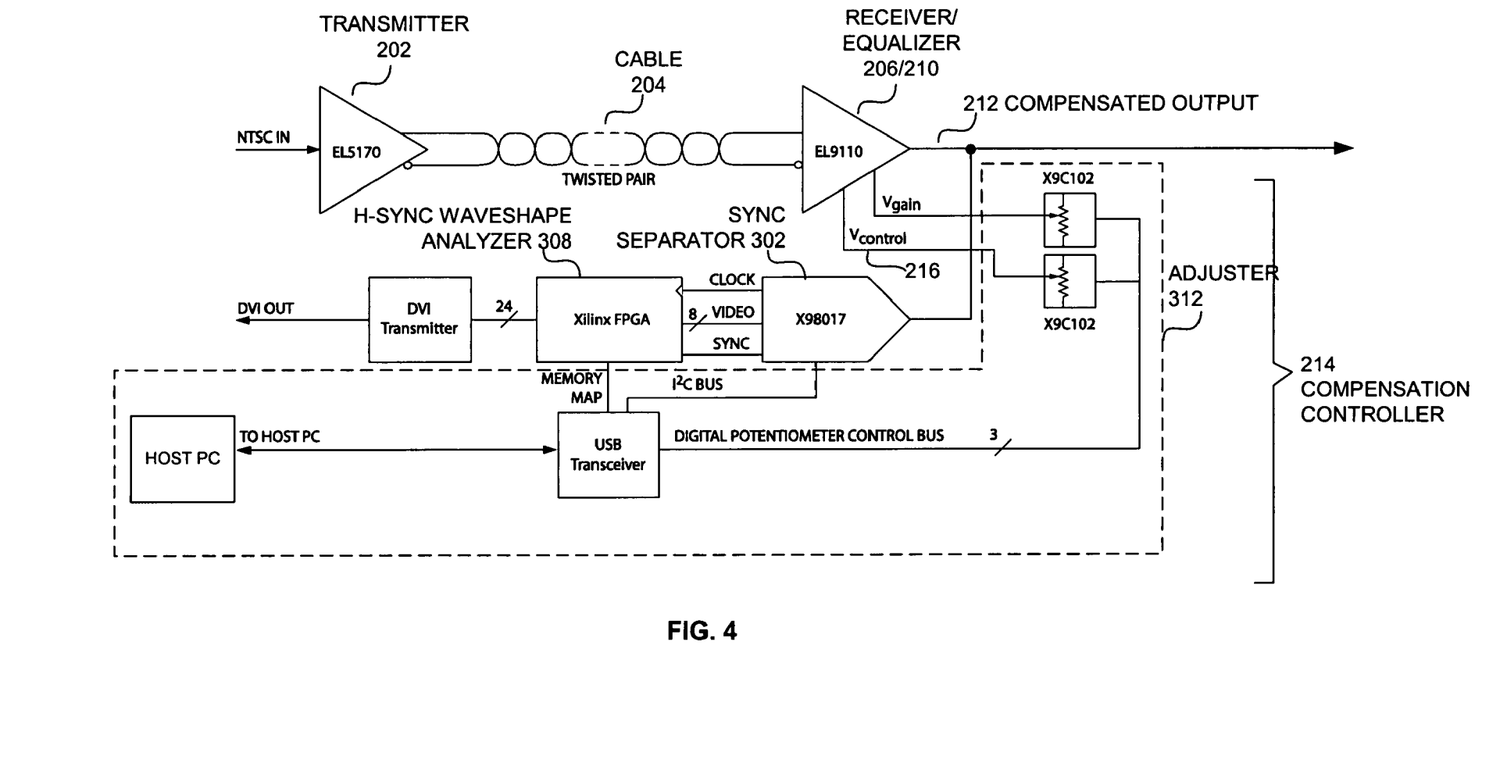
FIG. 4 is a block diagram that shows an implementation that was used for proof of concept.

FIG. 4 illustrates a specific implementation of the present invention that was used for proof of concept. Referring to FIG. 4, in this implementation the transmitter 202 is an EL5170 differential twisted pair driver available from Intersil Corporation of Milpitas, Calif. Alternatively, an EL5370, also available from Intersil Corporation, could have been used. A twisted-pair CAT5 cable 204 connects the transmitter 202 to a differential receiver/equalizer EL9110, also available from Intersil Corporation, which provides the functionality of both the receiver 206 and the equalizer 208. The compensated output 212 from the receiver/equalizer 206/208 is provided to an X98017 triple video digitizer, also known as an "analog front end" (AFE), available from Intersil Corporation, which provides the functionality of the sync separator 302. A field programmable gate array (FPGA), available from Xilinx Inc. of San Jose, Calif., provides the functionality of the H-sync waveshape analyzer 308. A USB Transceiver, a host PC and an X9C102 digitally controlled-potentiometer, available from Intersil Corporation, provides the functionality of the adjuster 312. A second X9C102 digitally-controlled potentiometer is also provided to adjust the overall gain of the EL9110 differential receiver/equalizer 206/210.

In this specific implementation, the Intersil X98017 triple video digitizer, referred to hereafter as an AFE, includes three 150 MHz analog to digital converters (ADCs) for red, green and blue channels (or Y, Pb and Pr channels), along with sync separators, DC restore circuitry, automatic black level control, and amplifiers with digitally programmable gain and offset. The green channel alone was used to digitize an NTSC video signal at 25.175 MHz. This frequency was chosen because it matches the pixel clock of 640×480 DVI video, the final output of the system. At this sampling frequency, the sync tip was sampled 118 times, providing more than enough time resolution to accurately measure its slope. Note that in normal operation the AFE does not waste any of its 8-bit dynamic range on the sync tip because the bottom of the sync tip is usually below code zero. Accordingly, to measure the sync tip slope digitally, the AFE's offset was first raised until no part of the signal was below code zero. After the slope measurement, the offset was lowered again for normal viewing. The AFE was adjusted via the USB transceiver's 12C bus.

The X98017 AFE provided the recovered pixel clock, digitized NTSC video data, and sync information to the Xilinx FPGA. The FPGA then digitally decoded the video signal and measured signal characteristics including the sync tip slope. To measure the sync tip slope, the FPGA sampled at least two points on the sync tip, each a specific number of pixel clocks after the beginning of each horizontal sync period, and stored the difference in a register.

The host PC read this slope register through the USB transceiver. If it was worse than a programmed threshold, the PC adjusted the digitally-controlled X9C102 potentiometers to improve the, compensation. The PC knew to increase or decrease the compensation based on whether the slope was too negative or too positive.

The following loop algorithm was used to test the circuit of FIG. 4 for proof of concept. During the performing of these steps, an oscilloscope was used to capture the incoming video signal, just prior to it being digitized by the X98017 (before running the auto-compensation loop), as well as after running the auto-compensation loop. Additionally, a network analyzer was used to capture of the transmission line (including the EL5170, CAT5 cable, and EL9110) after running the auto-compensation loop.

1. The EL9110 equalization was set to a mid-scale value, as a starting guess, by writing to the appropriate X9C102 digital potentiometer through the USB transceiver.
2. The EL9110 analog gain was set to its highest setting by writing to the other X9C102 digital potentiometer through the USB transceiver.
3. The EL9110 analog gain was then lowered until the X98017 AFE began to reliably lock to the video signal.
4. The X98017 AFE offset was then raised until its digital output no longer went to zero, i.e., so the bottom of the sync tip was "visible" to the rest of the digital logic.
5. The EL9110 equalization was then set to zero.

6. The sync tip slope was measured, using averaging it to eliminate noise.

7. The EL9110 equalization was then incrementally increased by a small amount, until the measured sync tip slope was acceptably flat.

8. Once the sync tip was acceptably flat, the offset of X98017 AFE was lowered back to its default value.

9. The gain of the X98017 AFE was then increased until the video signal filled its dynamic range, to provide gain control.

Figure 5:
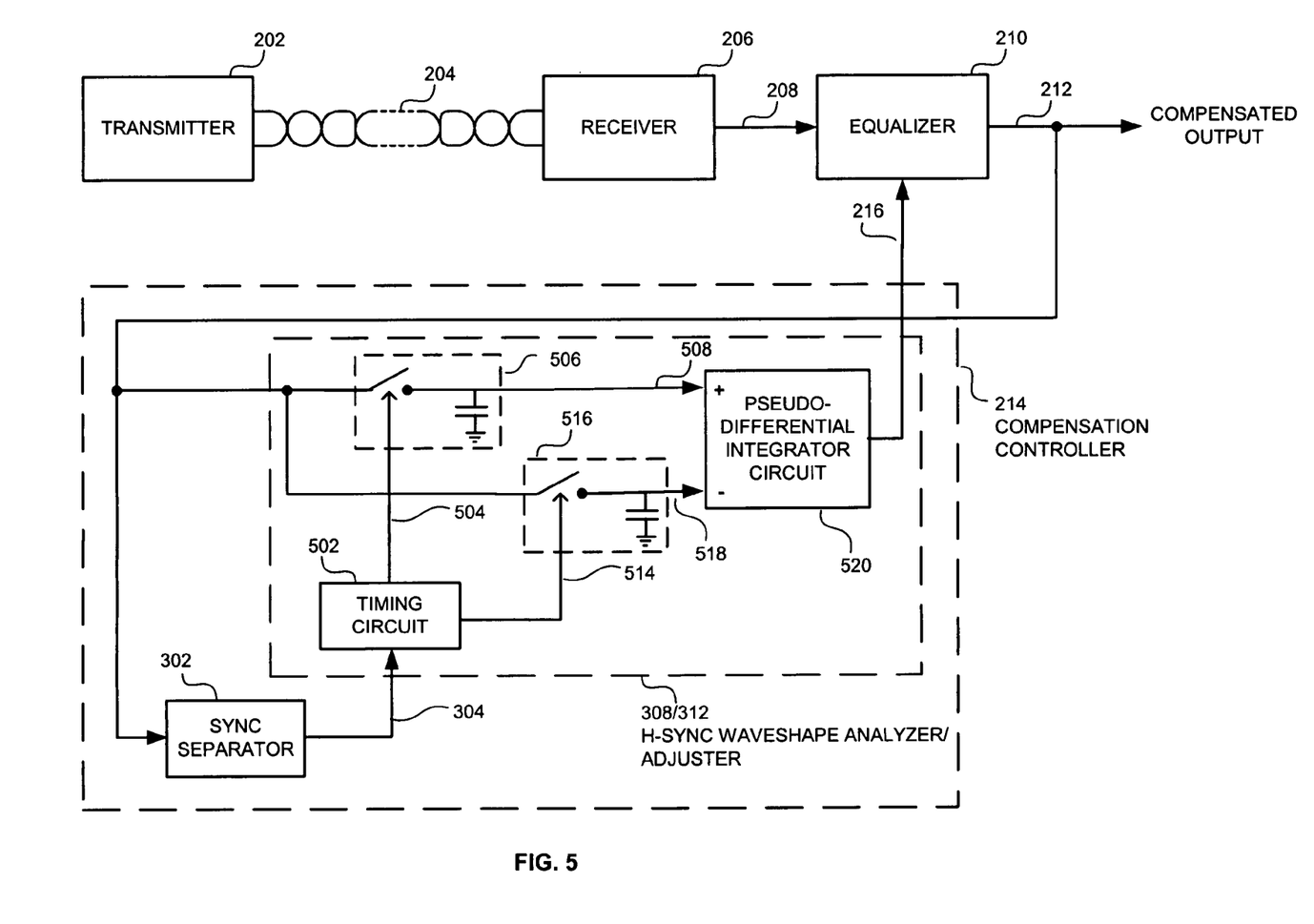
FIG. 5 is a block diagram that shows additional details of the compensation controller of FIG. 2, according to specific embodiments of the present invention.

FIG. 5 illustrates another implementation of the present invention. As will be explained below, the system of FIG. 5 uses the shape of the H-sync portion of the compensated video signal 212 to generate a compensation adjustment signal 216 that automatically converges to an optimum value.

In this implementation, the H-sync waveshape analyzer 308 and the adjuster 312 are collectively implemented using a timing circuit 502, a first hold circuit 506, a second hold circuit 516, and a differential integrator circuit 520. As with the previous implementation, the sync separator 302 receives the compensated video signal 212 and outputs a horizontal sync signal 304 indicative of the presence of the horizontal sync portion of the compensated video signal 212. The timing circuit 502 receives the horizontal sync signal 304 and outputs a first trigger signal 504 and a second trigger signal 514, which are provided, respectively, to the first hold circuit 506 and the second hold circuit 516. The first hold circuit 506, which is a sample-and-hold or a track-and-hold circuit, samples or tracks the compensated video signal 212 in response to the first trigger signal 504 and outputs a first voltage signal 508. Similarly, the second hold circuit 516, which is a sample-and-hold or a track-and-hold circuit, samples or tracks the compensated video signal 212 in response to the second trigger signal 514 and outputs a second voltage signal 518. The differential integrator 520, which includes a positive (+) input and a negative (−) input, receives the first and second voltage signals 508 and 518 at its inputs and outputs the compensation adjustment signal 216 that adjusts the compensation provided by the equalize 210.

In specific embodiments, the first trigger signal 504 output by the timing circuit 502 includes a first pulsed waveform that defines a first time interval chosen to coincide with the particular region of the H-sync portion of the compensated video signal 212, where the H-sync waveform has not yet reached it final value (i.e., has not yet settled) in cases where the video signal 212 is under or overcompensated. The second trigger signal 514 output by the timing circuit 502 includes a second pulsed waveform that defines a second time interval that follows the first time interval, and which is chosen to coincide with the particular region of the H-sync portion of the compensated video signal 212, where the H-sync waveform has generally already reached its final value (i.e., has generally settled) even if the video signal 212 is under or overcompensated. In this embodiment, the duration of the sum of the first time interval and the second time interval should be less than the duration the H-sync portion itself.

Each hold circuit 506 and 516 is shown as including a respective switch and charge holding capacitor, however, more complex circuits can be used. When a switch is closed, the selected level of the compensated video signal 212, and more specifically, the selected level of the H-sync portion of the compensated video signal 212, is applied to the corresponding input of the differential integrator 520. When a switch is opened, the most recent level applied to a corresponding input of the differential integrator 520 is held at that level by the capacitor.

In the implementation shown, during the first timing interval (i.e., when the switch of hold circuit 506 is closed), a voltage level that coincides with the particular region of the H-sync portion where it has not yet reached it final value (i.e., has not yet settled) is applied to the positive input of the differential integrator circuit 520, and this voltage level is held at that input (i.e., when the switch of the hold circuit 506 is opened), until the H-sync portion of the signal 212 is again detected (and the switch is again closed). Accordingly, the first voltage signal 508 is indicative of the level of the horizontal sync portion of the compensated video signal before it has generally settled. During the second timing interval (i.e., when the switch of hold circuit 516 is closed), the voltage level that coincides with the particular region of the H-sync portion where it has generally already reached its final value (i.e., has generally settled) is applied to the negative input of the differential integrator circuit 520, and this voltage level is held at that input (i.e., when the switch of the hold circuit 506 is opened), until the H-sync portion of the signal 212 is again detected (and the switch is again closed). Accordingly, the second voltage signal 518 is indicative of the level of the horizontal sync portion of the compensated video signal after it has generally settled. The differential integrator 520 integrates the difference between its inputs, with the resulting integrator output voltage being applied as the compensation control signal 216 to the equalizer 210.

When the compensated video signal 212 is undercompensated, the difference between the first voltage signal 508 and the second voltage signal 518 will be positive. When the compensated video signal 212 is overcompensated, the difference between the first voltage signal 508 and the second voltage signal 518 will be negative. The differential integrator 520, which can be, e.g., a pseudo-differential integrator or a fully-differential integrator, integrates that difference to produce an indefinitely increasing or indefinitely decreasing output waveform that acts as the compensation control signal 216. This results in more or less compensation, respectively, to be performed by the equalizer 210. When the auto-compensation loop reaches equilibrium, the difference between the signals 508 and 518 (which act as the integrands) is zero and the output of the differential integrator 520 reaches a steady-state, which results in the equalizer 210 applying the optimal compensation.

Figure 6A:
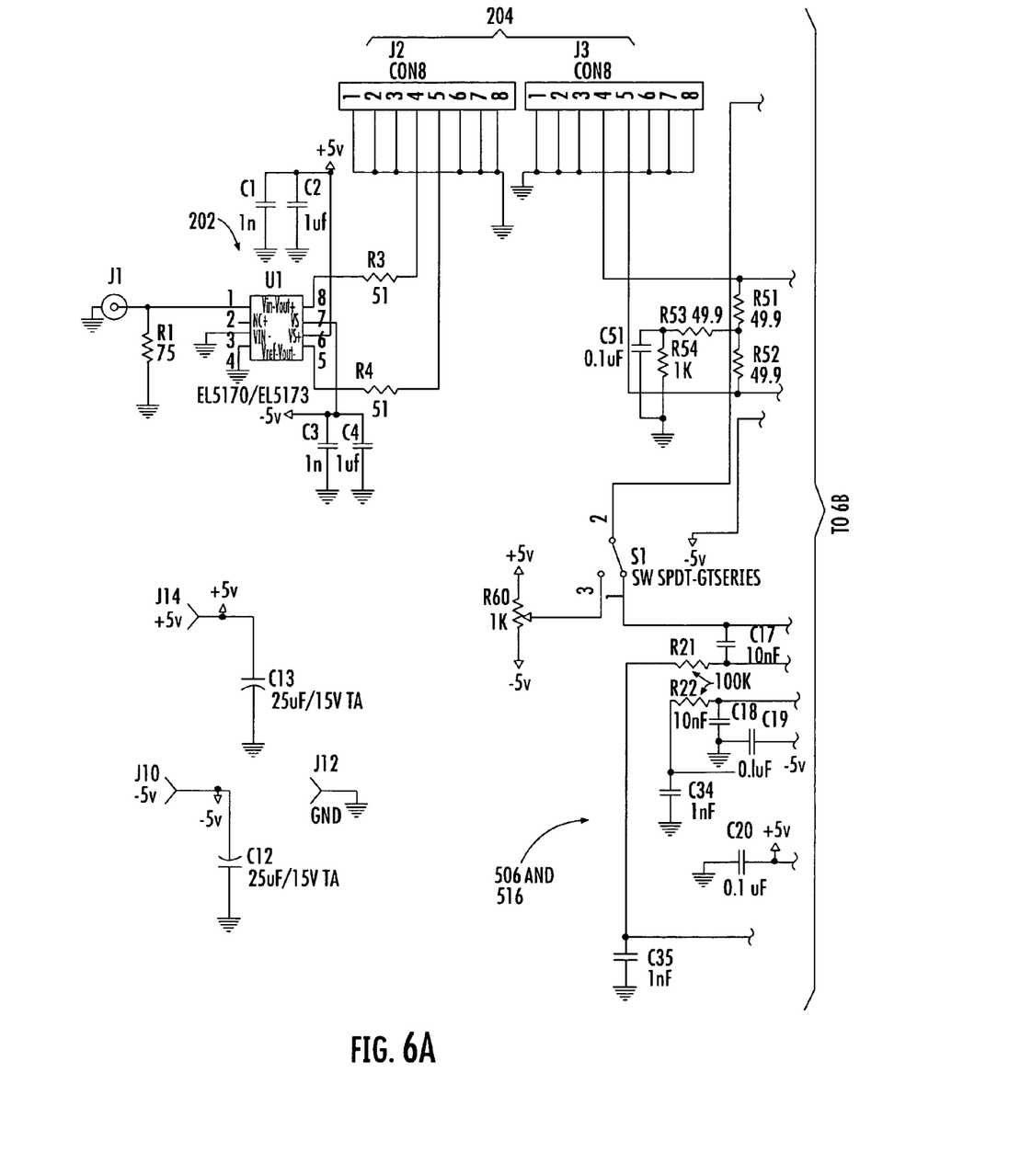
FIGS. 6A and 6B are a block diagram that shows a specific implementation of the embodiments discussed with reference to FIG. 5.
Figure 6B:
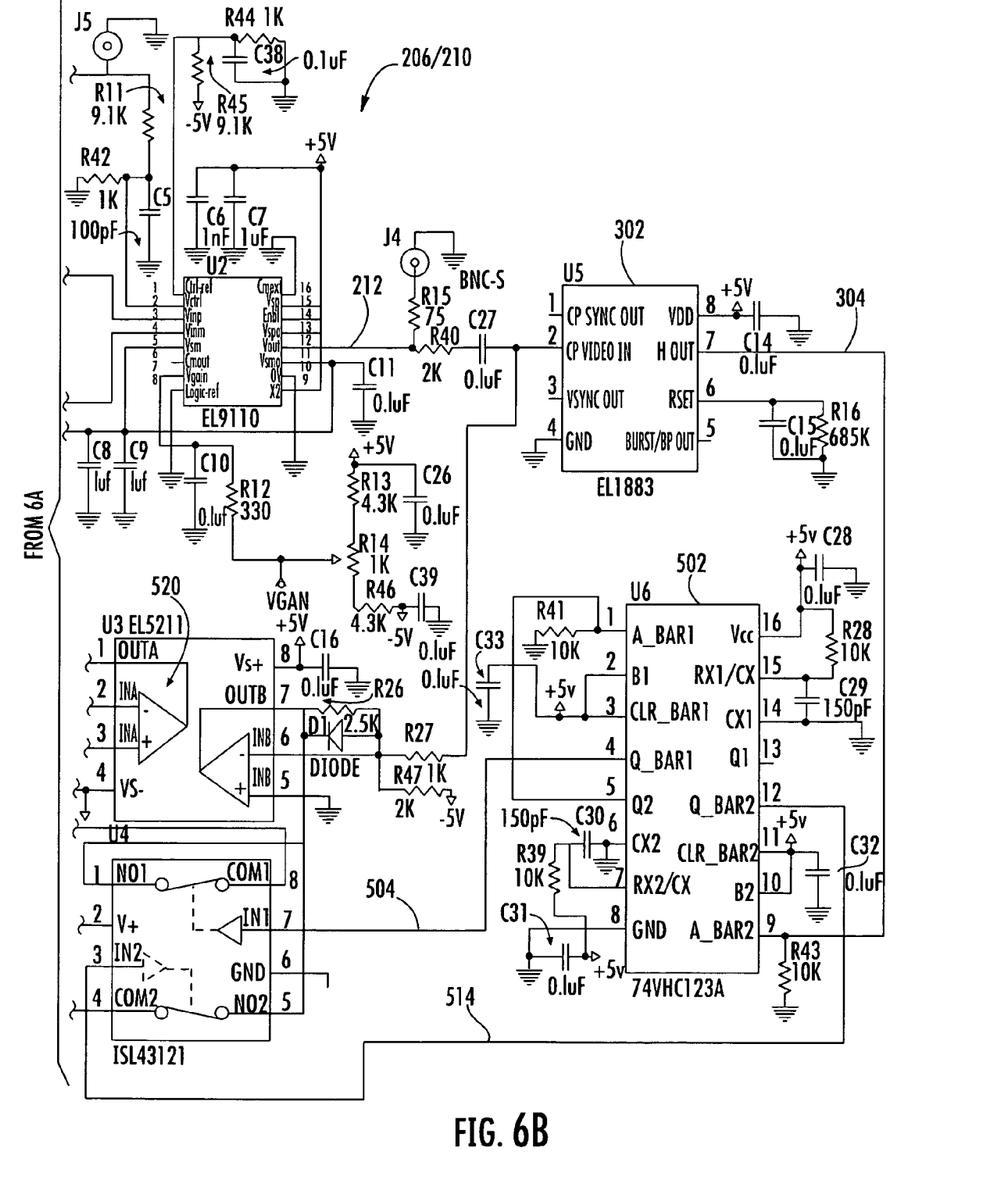

FIGS. 6A and 6B illustrates a specific implementation of the embodiment of FIG. 5. In this implementation, the transmitter 202 is an EL5170 or 5173 differential twisted pair driver available from Intersil Corporation. A twisted-pair CAT5 cable 204 connects the transmitter 202 to and a differential receiver/equalizer EL9110, available from Intersil Corporation, which provides the functionality of both the receiver 206 and the equalizer 208. An EL1883 sync separator, available from Intersil Corporation, is used as the sync separator 302. A 74VHC123A dual retriggerable monostable multivibrator, available from Fairchild Semiconductor of South Portland, Me., is used as the timing circuit 502. The capacitor C34 along with one of the switches of the ISL43121 dual analog switch, available from Intersil Corporation, provides the first hold circuit 506. The capacitor C35 along with the other one of the switches of the ISL43121 dual analog switch provides the second hold circuit 516. One of the op-amps from an EL5211 dual op-amp, available from Intersil Corporation, is used as the differential-integrator circuit 520. The other op-amp of the EL5211 is used as an inverter so that the compensated video signal 212 provided to the two hold circuit 506 and 516 has the proper polarity.

In an alternative embodiment, the second time interval begins at the same time as the first time interval, but has a duration that is longer (e.g., double) that of the first time interval. In such embodiment, the first voltage signal 508 is indicative of a level of the horizontal sync portion of the compensated video signal before it has settled (as in the prior embodiment), but the second voltage signal 518 is indicative of an average level of the horizontal sync portion of the compensated video signal. This should provide for a simpler implementation, but with the compensation control signal 216 not converging as quickly to its optimum value. For the embodiments discussed with reference to FIGS. 5 and 6, the video signal is preferably DC coupled because the first and second voltage signals 508 and 518 are not derived concurrently. In such embodiments, the differential integrator 520 uses a reference voltage derived essentially from the steady-state value of the H-sync portion of a previous line of video, while integrating the beginning of the H-sync portion of a present line of video. In other words, the integrator reference is only available after the active integration interval, forcing the use of the previously acquired reference for that function. While an error caused from this is transient in nature, it can be easily minimized with appropriate choice of time constants for the integrator 520 and hold circuits 506 and 516. Alternatively, if desired, the voltages acquired during the first and second time intervals can be acquired separately, and then, after their acquisition is completed (in every line of video), their difference can be applied to the integrator 520 to produce the compensation control signal 216.

The present invention has been described above with the aid of functional building blocks illustrating the performance of specified functions and relationships thereof. The boundaries of these functional building blocks have often been arbitrarily defined herein for the convenience of the description. Unless otherwise specified, alternate boundaries can be defined so long as the specified functions and relationships thereof are appropriately performed. Any such alternate boundaries are thus within the scope and spirit of the claimed invention. For example, as described above, the receiver 206 and the equalizer 210 can be combined into a single block that performs the functions of both a receiver and an equalizer.

The forgoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. Slight modifications and variations are believed to be within the spirit and scope of the present invention. It is intended that the scope of the invention be defined by the following claims and their equivalents.

What is claimed is:

1. A method to provide automatic compensation for frequency attenuation of a video signal transmitted over a cable, comprising:
   frequency compensating a received video signal that was transmitted over a cable to produce a compensated video signal;
   producing a first voltage signal indicative of a level of a horizontal sync portion of the compensated video signal before it has settled;
   producing a second voltage signal indicative of a level of the horizontal sync portion of the compensated video signal after it has generally settled, or indicative of an average level of the horizontal sync portion of the compensated video signal;
   integrating a difference between the first and second voltage signals to produce a compensation control signal; and
   automatically adjusting the frequency compensating based on the produced compensation control signal.

2. The method of claim 1, wherein the automatically adjusting step causes a slope of a sync tip of the horizontal sync portion of the compensated video signal to be within a specified minimum acceptable slope.

3. The method of claim 1, wherein the second voltage signal is indicative of the level of the horizontal sync portion of the compensated video signal after it has generally settled.

4. The method of claim 1, wherein the second voltage signal is indicative of the average level of the horizontal sync portion of the compensated video signal.

5. A system to provide automatic compensation for frequency attenuation of a video signal transmitted over cable, comprising:
   means for frequency compensating a received video signal that was transmitted over a cable to produce a compensated video signal;
   means for producing a first voltage signal indicative of a level of a horizontal sync portion of the compensated video signal before it has settled;
   means for producing a second voltage signal indicative of a level of the horizontal sync portion of the compensated video signal after it has generally settled, or indicative of an average level of the horizontal sync portion of the compensated video signal;
   means for integrating a difference between the first and second voltage signals to produce a compensation control signal; and
   means for automatically adjusting the frequency compensating based on the produced compensation control signal.

6. The system of claim 5, wherein a the second voltage signal is indicative of the level of the horizontal sync portion of the compensated video signal after it has generally settled.

7. The system of claim 5, wherein the second voltage signal is indicative of the average level of the horizontal sync portion of the compensated video signal.

8. The system of claim 5, wherein the means for frequency compensating comprises an equalizer.

9. A system to provide automatic compensation for frequency attenuation of a video signal transmitted over cable, comprising:
   an equalizer that frequency compensates a received video signal that was transmitted over a cable to produce a compensated video signal;
   a compensation controller that
      produces a first voltage signal indicative of a level of a horizontal sync portion of the compensated video signal before it has settled;
      produces a second voltage signal indicative of a level of the horizontal sync portion of the compensated video signal after it has generally settled, or indicative of an average level of the horizontal sync portion of the compensated video signal; and
      integrates a difference between the first and second voltage signals to produce a compensation control signal;
   wherein the frequency compensation provided by the equalizer is automatically adjusted based on the compensation control signal produced by the compensation controller.

10. The system of claim 9, wherein the compensation controller includes:
- a sync separator that receives the compensated video signal and outputs a horizontal sync signal indicative of the presence of the horizontal sync portion of the compensated video signal;
- a timing circuit that receives the horizontal sync signal and outputs a first trigger signal and a second trigger signal;
- a first hold circuit that samples or tracks the compensated video signal in response to the first trigger signal and outputs the first voltage signal;
- a second hold circuit that samples or tracks the compensated video signal in response to the second trigger signal and outputs the second voltage signal; and
- a differential integrator that receives the first and second voltage signals and outputs the compensation control signal that adjusts the compensation provided by the equalizer.

11. The system of claim 10, wherein:
- the first trigger signal includes a first pulsed waveform that selectively closes a switch of the first hold circuit; and
- the second trigger signal includes a second pulsed waveform that selectively closes a switch of the second hold circuit.

12. The system of claim 9, wherein:
- the second voltage signal is indicative of the level of the horizontal sync portion of the compensated video signal after it has generally settled.

13. The system of claim 9, wherein:
- the second voltage signal is indicative of the average level of the horizontal sync portion of the compensated video signal.

14. The system of claim 9, wherein the equalizer provides optimal compensation when the compensation control signal output by the differential integrator reaches a steady state.

* * * * *

UNITED STATES PATENT AND TRADEMARK OFFICE
CERTIFICATE OF CORRECTION

| | | |
|---|---|---|
| PATENT NO. | : 8,341,689 B2 | Page 1 of 1 |
| APPLICATION NO. | : 11/255360 | |
| DATED | : December 25, 2012 | |
| INVENTOR(S) | : Craddock et al. | |

It is certified that error appears in the above-identified patent and that said Letters Patent is hereby corrected as shown below:

In the Claims

Col. 10, line 38: After "wherein" and before "the" delete "a"

Signed and Sealed this
Seventeenth Day of September, 2013

Teresa Stanek Rea
*Deputy Director of the United States Patent and Trademark Office*